April 26, 1960 | HUNG C. LIN | 2,934,641

STABILIZATION MEANS FOR SEMI-CONDUCTOR SIGNAL CONVEYING CIRCUITS

Filed March 1, 1954 | 4 Sheets-Sheet 1

INVENTOR.
HUNG CHANG LIN

BY H. Newton
ATTORNEY

INVENTOR.
HUNG CHANG LIN

BY H. C. Newton
ATTORNEY

April 26, 1960 HUNG C. LIN 2,934,641

STABILIZATION MEANS FOR SEMI-CONDUCTOR SIGNAL CONVEYING CIRCUITS

Filed March 1, 1954 4 Sheets-Sheet 3

INVENTOR.
HUNG CHANG LIN

BY H. O. Newton

ATTORNEY

INVENTOR.
HUNG CHANG LIN
BY H. C. Newton
ATTORNEY

United States Patent Office 2,934,641

Patented Apr. 26, 1960

2,934,641

STABILIZATION MEANS FOR SEMI-CONDUCTOR SIGNAL CONVEYING CIRCUITS

Hung C. Lin, Levittown, Pa., assignor to Radio Corporation of America, a corporation of Delaware Application March 1, 1954, Serial No. 413,214

2 Claims. (Cl. 250—20)

This invention relates in general to signal conveying and other electrical circuits which utilize semi-conductor devices as active signal amplifying and translating elements, and in particular to means for stabilizing such circuits with temperature variations.

The development of commercially useful semi-conductor devices such as transistors has had a pronounced effect upon and has caused the introduction of many new techniques in the electronic signal communication field. Transistors have many advantages including their small size and durability, especially when compared with the ordinary vacuum tube. In addition, they require no heater power and consist of materials which appear to have a long useful life. Consequently, the use of transistors in signal conveying and other electrical circuits has been, and is, the subject of extensive investigation.

While possessing all of the above as well as other advantages, transistors are known to be highly temperature sensitive. Thus, variations in the ambient temperature as well as variations due to the heat dissipation from the transistors themselves will affect their operation to a considerable extent in some cases. These temperature variations may cause changes in certain parameters and operating characteristics of the transistors to the extent that their operation may become unstable and therefore unreliable. Various methods and systems have been tried in an attempt to compensate for these undesirable changes. Most of the known compensating techniques require the use of extra circuit elements which add to the cost and bulk of the equipment. In addition, the known methods have not been found to compensate for temperature variations as adequately and completely as needed for most efficient operation.

It is known for most efficient operation and minimum distortion, a transistor requires a certain optimum forward bias voltage between its emitter and base electrodes. Furthermore, it has been found that this biasing voltage is very sensitive to changes in temperature. Accordingly, unless provision is made to compensate for the changing requirements of the forward emitter-to-base voltage with temperature changes, distortion will result and the direct current collector current will change.

It is believed that there are two factors or characteristics of junction transistors which make the forward-emitter-to-base voltage sensitive to temperature as mentioned above. One of these factors is the base saturation current of the transistor, that is, the base current that flows for collector saturation. Changes of temperature will also change the base saturation current. The other of these factors is the so-called zero voltage conductance which also changes as the temperature varies. For further explanation of this factor, reference is made to volume 83 of the "Physical Review," July 1, 1951, pages 151 to 162. The zero voltage conductance factor may be considered, for purposes of explanation, to be somewhat similar to the perveance coefficient as employed in electron tube studies.

In one known method of temperature compensation, a temperature sensitive device, having a temperature coefficient substantially identical with that of the transistor, is utilized to establish the bias voltage between the base and emitter of the transistor. The temperature sensitive device may be, for example, a germanium diode. While such a method is effective it does not compensate for changes of base saturation current and does not, therefore, furnish optimum bias at elevated temperatures. Furthermore, this method requires the use of an extra circuit element.

Accordingly, it is an object of the present invention to provide an improved semi-conductor signal conveying circuit wherein means are provided for stabilizing the circuit with temperature variations.

It is another object of the present invention to provide an improved signal conveying circuit utilizing transistors as the amplifying elements thereof wherein temperature sensitive bias voltage is provided for the transistors.

It is a further object of the present invention to provide an improved temperature sensitive bias voltage supply circuit for a semi-conductor signal translating or amplifying device which provides stable and efficient operation over a wide range of ambient temperatures.

It is yet another object of the present invention to provide improved signal conveying circuits utilizing transistors as signal translating and amplifying elements which provide stable operation with temperature variations and utilize a minimum number of circuit elements.

These and further objects and advantages are achieved, in general, by utilizing one transistor to establish the bias conditions between the base and emitter electrodes of another transistor. In this manner, compensation for temperature variations is achieved, and the optimum base-to-emitter bias of the second transistor is maintained. By using the first transistor as a signal amplifier in a signal receiver, for example, and the second transistor as a detector, compensation is achieved without using extra circuit elements.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
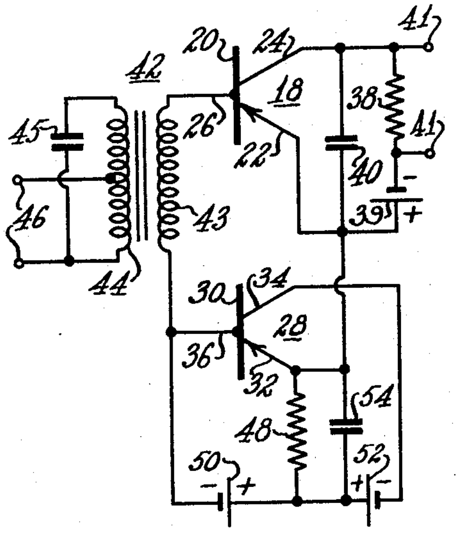
Figures 1, 3, 5 and 7 are schematic circuit digrams illustrating various embodiments of the invention in signal conveying circuits, wherein one P-N-P junction transistor is used to compensate for temperature variations of another P-N-P junction transistor.

Referring now to the drawing wherein like parts are designated by like reference numerals throughout the figures, and referring particularly to Figure 1, a signal conveying circuit comprises a pair of junction transistors 18 and 28, each of which is, by way of example, of the P-N-P junction type. Transistor 18 includes a semi-conductive body 20 and three contacting electrodes which are designated as an emitter 22, a collector 24 and a base 26. Similarly, the transistor 28 comprises a semi-conductive body 30 and three contacting electrodes which are similarly designated as an emitter 32, a collector 34 and a base 36.

To provide a collector bias voltage for the transistor 18, its collector 24 is connected through a load resistor 38 to the negative terminal of a direct current source of biasing voltage, such as illustrated by a battery 39. The positive terminal of the biasing battery 39 is connected directly with the emitter 22 of the transistor 18. To complete the output circuit for the transistor 18, a suitable by-pass capacitor 40 is connected between the collector 24 and the emitter 22 and in parallel with the load resistor 38 and the battery 39. Output signals may be taken from a pair of output terminals 41 which are connected respectively to either end of the load resistor 38. As thus described, the transistor 18 may be used as a signal amplifier or by suitable selection of biasing voltages as a signal detector.

The input circuit for the transistor 18 includes a tuned input transformer 42. To apply input signals to the transistor 18, the high signal voltage end of the secondary winding 43 is connected directly with the base 26 of transistor 18. The primary winding 44 is shunted by a tuning capacitor 45, which in combination with the primary winding 44 provides a tuned circuit which is parallel resonant at the frequency of the incoming signal. The incoming signal may be applied to the circuit at the input terminals 46, one of which is connected to a tap on the primary winding 44 and the other of which is connected to the low signal voltage end of the primary winding as shown.

The second transistor 28 is used, in accordance with the present invention, to provide a bias voltage which is sensitive to temperature for the base-emitter circuit of the first transistor 18. That is, a bias voltage is supplied from the transistor 28 to the transistor 18 which is variable with changes in temperature. Accordingly, and in accordance with the teachings of the invention, the base 26 of the first transistor is connected through the secondary winding 43 of the input transformer 42 to the base 36 of the second transistor 28. In addition, the emitter 32 of the second transistor 28 is connected directly with the emitter 22 of the first transistor 18. Thus, the base-emitter path through the semi-conductive body 20 is in series with the base-emitter path through the semi-conductive body 30. Accordingly, since both transistors are of the same conductivity type, that is, both transistors are of N-type conductivity, the polarity is correct for proper biasing.

Constant current emitter bias is used for the second transistor 28. To this end, a resistor 48 having a relatively large resistance value is connected in series with the emitter 32 of this resistor and to the junction of the positive terminals of a pair of biasing batteries 50 and 52. To complete the biasing circuit for the second transistor 28, the negative terminal of the biasing battery 50 is connected with the base 36, while the negative terminal of the biasing battery 52 is connected directly with the collector 34 of the second transistor 28. Hence, the biasing will be recognized as being normal bias for a transistor of N-type conductivity, in this case a P-N-P junction transistor. Accordingly, the collector 34 is referred to as being biased in the reverse or relatively nonconducting direction, while the emitter 32 is referred to as being biased in the forward or relatively conducting direction, each with respect to the base 36. The constant current emitter biasing resistor 48 is by-passed for signal frequencies by a suitable by-pass capacitor 54. It should be noted that constant current emitter bias could be used for the compensated transistor 18 by using a high external emitter resistance. Since, however, a by-passed emitter resistor gives rise to distortion for changing signal levels due to changes in bias, constant current emitter bias for the compensated transistor is not utilized in the preferred embodiment of the invention. Moreover, an un-by-passed resistor in the emitter circuit will reduce the gain of that stage.

As thus described, it is readily apparent that the base-to-emitter bias of the first transistor 18 is derived from the direct current voltage which exists between the emitter 32 and the base 36 of the second transistor 28. This voltage may be adjusted to a desired value by changing the resistance of the emitter biasing resistor 48.

The direct current voltage between the base and emitter of a constant emitter current biased transistor, as described, is a function of the so-called zero voltage conductance of the particular transistor. Since, as was explained hereinbefore, the zero voltage conductance of a transistor changes with changes in temperature, the base-to-emitter voltage of the second transistor 28 can be used, and is used, in accordance with the present invention to provide a temperature sensitive bias for the first transistor 18. Hence, any change in the zero voltage conductance and thus the base-emitter voltage of the first transistor 18 will be completely compensated for by the change in these same characteristics of the second transistor 28.

As was mentioned hereinbefore, experimental evidence indicates that there are two factors which make the optimum bias of a transistor temperature sensitive. One of these is the zero voltage conductance, which as described herein, is compensated for by the present invention. The other of these is the base saturation current of the transistor, that is, the base current that flows for collector saturation. It is this latter factor which prior art methods have not been able to compensate for. Hence, optimum bias at elevated temperatures has not been possible by the prior art temperature compensation methods. In accordance with the teachings of the present invention, this deficiency of the prior art circuits is overcome.

The base saturation current flows through the base lead of the transistor. Since the base lead of the transistor has resistance, a voltage drop is created across this resistance due to the flow of base saturation current which creates an internal bias for the transistor. Furthermore, the base saturation current increases with increases of temperature. Hence, an internal bias which varies with temperature is established by the variations of base saturation current flow. It is in this manner that the bias for the transistor varies with temperature causing unstable operation.

By provision of the present invention, however, it is evident that any change in the base saturation current of the first transistor 18 due to changes of the ambient temperature will be compensated for by the change of base saturation current of the second transistor 28. Accordingly, any change in the bias condition of the first transistor 18 due to the variation of base saturation current will be cancelled by a like variation of the base saturation current of the second transistor 28. Thus, optimum bias for the first transistor 18 is established over its operating range and irrespective of ambient temperature variations by furnishing its base-emitter bias from the base-emitter circuit of the second transistor 28. Consequently, by virtue of the present invention, a high gain distortion-free transistor stage is possible despite serious changes in ambient temperature. This is accomplished, moreover, without the addition of extra circuit elements.

The invention is not limited to transistors of specific conductivity types. Hence, an N-P-N transistor may be used to derive a temperature sensitive bias for another N-P-N transistor. This could be accomplished by a circuit of the type illustrated in Figure 1 of the drawing, for example, by reversing the polarity of the biasing batteries 39, 52 and 50. It is also possible to derive a temperature sensitive bias for a transistor of one conductivity type by a transistor of another conductivity type. This is accomplished by a circuit of the type illustrated in Figure 2 of the drawing, reference to which is now made.

Figure 2:
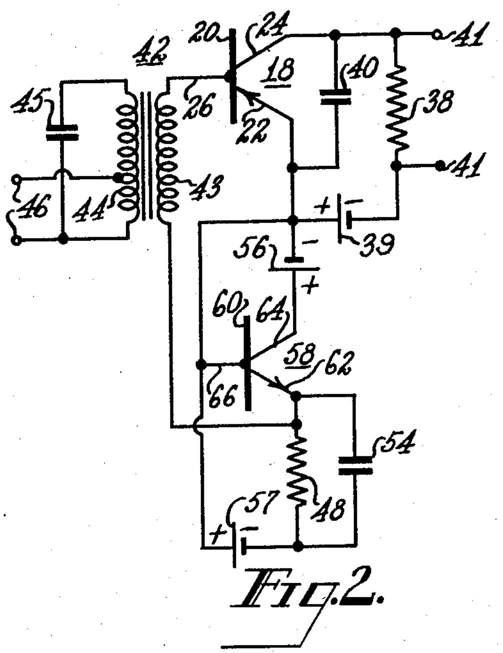
Figures 2, 4, 6, 8 and 9 are schematic circuit diagrams further illustrating various embodiments of the invention in signal conveying circuits, wherein an N-P-N junction transistor is used to compensate for temperature variations of a P-N-P junction transistor.

In Figure 2, the first transistor 18 is of the P-N-P junction type and contains similar connections for biasing and an identical input circuit with its counterpart as illustrated in Figure 1. A temperature sensitive base-to-emitter bias for the first transistor 18 is derived, however, in accordance with this embodiment of the invention, from the base-emitter circuit of an opposite conductivity type transistor in this case which is illustrated as being an N-P-N junction transistor 58.

The second transistor 58 includes a semi-conductive body 60 of the N-P-N junction type, and three contacting electrodes which have been designated as an emitter 62, a collector 64 and a base 66. To provide proper biasing voltages for the second transistor 58, a biasing battery 56 has its positive terminal connected directly with the collector 64 of the transistor 58. The negative terminal of the biasing battery 56 is returned to a fixed reference point, that is, the junction of the collector biasing battery 39 for the first transistor 18 and the emitter 22 of that transistor. The second transisitor 58 is constant current emitter biased by a resistor 48 and a further biasing battery 57 which are connected in series with the emitter 62. The positive terminal of the battery 57 is connected with the base 66 of the second transistor.

Since, as shown in Figure 2, a transistor of one conductivity type is used to derive the bias for a transistor of the opposite conductivity type, proper biasing polarity is maintained by connecting the emitter and base of one transistor to the base and emitter, respectively, of the other transistor. To this end, and in accordance with the invention, the base 26 of the P-N-P transistor 18 is connected through the secondary winding 43 of the input transformer 42 to the junction of the emitter 62 and the emitter biasing resistor 48 of the N-P-N transistor 58. Further, the base 66 of the N-P-N transistor 58 is connected to the emitter 22 of the P-N-P transistor 18. Thus, as in Figure 1, the base-emitter path through the semi-conductive body of one transistor is in series with the base emitter path through the semi-conductive body of the other transistor.

The circuit illustrated in Figure 2 of the drawing is thus seen to provide a temperature sensitive bias for the first transistor 18 in much the same manner as in Figure 1. The only differences in the two figures are first, the biasing arrangement, the one illustrated in Figure 2 being somewhat more convenient since a floating battery is not required, and secondly, the circuit connections from one transistor to the other—each circuit being arranged to satisfy the respective polarity requirements of the particular biasing voltages employed. In operation, the two circuits are identical, each providing a bias for the first transistor 18 which is temperature sensitive and which compensates for both zero voltage conductance and base saturation current variations with changes in temperature. It should be noted that in the case of Figure 2, as throughout the figures, the conductivity type of each transistor may be reversed if the polarity of the biasing batteries is also reversed.

In some cases, since the characteristics of transistors vary from unit to unit, even though they are intended to be alike when manufactured, the voltage drop across the base lead resistance due to base saturation current flow of the compensating transistor, i.e., the second transistor as referred to above, is greater than the voltage which is needed to compensate for the voltage drop due to base saturation current flow in the compensated transistor, i.e., the first transistor as referred to above. To avoid this condition, in accordance with the invention, a resistor having a predetermined resistance value is connected in the base circuit of the compensated transistor. This has been illustrated in Figures 3 and 4 of the drawing where the existence of a condition as outlined above is assumed.

Figure 3:
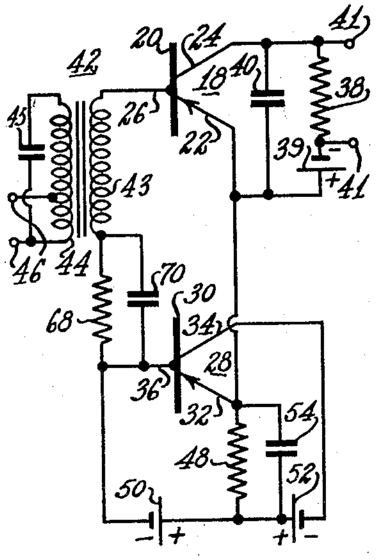

In Figure 3, a circuit similar to that of Figure 1 is illustrated and comprises two transistors 18 and 28 which are practically identical with their counterparts in Figure 1. The sole difference in the two circuits is the inclusion of the resistor 68, which is connected in series with the transformer secondary 43 and between the base 26 of the first transistor 18 and the base 36 of the second transistor 28. A by-pass capacitor 70 is connected in parallel with the resistor 68 from the low signal voltage end of the secondary winding 43 to the base 36. Hence, if the internal voltage drop across the base lead resistance due to base saturation current flow of the second transistor 28 is greater than the voltage drop across the base lead resistance due to the base saturation current flow of the first transistor 18, the insertion of the resistor 68 in the circuit as shown will increase the voltage drop in the base circuit of the first or compensated transistor 18 so as to equal the voltage drop across the base lead resistance of the second or compensating transistor 28.

Figure 4:
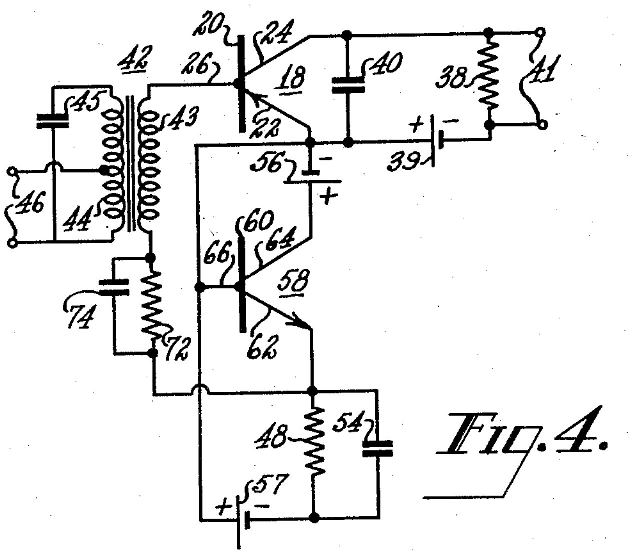

Similarly, in Figure 4, the resistor 72 is connected in series with the secondary winding 43 of the input transformer 42 between the base 26 of the first transistor 18 and the emitter 62 of the second transistor 58. This resistor is by-passed for signal frequencies by a capacitor 74. In other respects the circuit is identical with the circuit illustrated in Figure 2 of the drawing. As in the case of the conditions assumed for Figure 3, however, the voltage drop across the base lead resistance of the compensating transistor, here the N–P–N junction transistor 58, is greater than the voltage which is needed to compensate for the voltage drop due to base saturation current flow in the first transistor 18. Accordingly, the insertion of the resistor 72 and the by-pass capacitor 74 in the circuit as shown will compensate for these unequal voltage drops so that they will become equal.

In other cases, due again to the varying characteristics of different transistors, the voltage drop across the base lead resistance due to base saturation current flow of the compensating transistor will be less than the voltage which is needed to compensate for the voltage drop due to base saturation current flow in the compensated transistor. To avoid this condition, a resistor having a predetermined resistance value is connected in the base circuit of the compensating transistor. This has been illustrated in Figures 5 and 6 of the drawing where the existence of a condition as outlined above is assumed.

Figure 5:
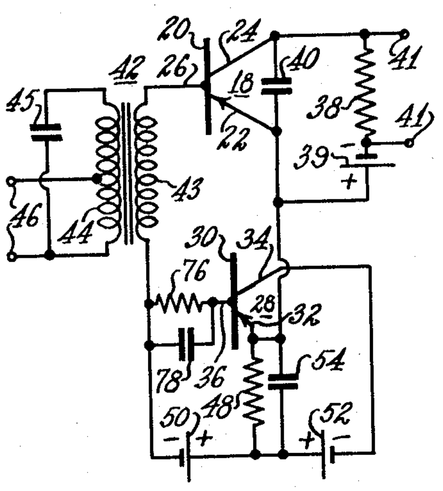

In Figure 5, a circuit similar to that of Figure 1 is illustrated and comprises two P–N–P transistors 18 and 28. The sole difference in the two circuits is the inclusion of the resistor 76 and the by-pass capacitor 78 in the circuit. The resistor 76 is connected in series between the secondary winding 43 of the input transformer and the base 36 of the second transistor 28 while the capacitor is connected in parallel with the resistor 76 between the base 36 and the negative terminal of the biasing battery 50. Accordingly, if the internal voltage drop across the base lead resistance due to base saturation current flow of the second transistor 28 is less than the voltage drop across the base lead resistance due to the base saturation current flow of the first transistor 18, the insertion of the resistor 76 in the circuit as shown will increase the voltage drop in the base circuit of the second or compensating transistor 28 so as to equal the voltage drop across the base lead resistance of the first or compensated transistor 18.

Figure 6:
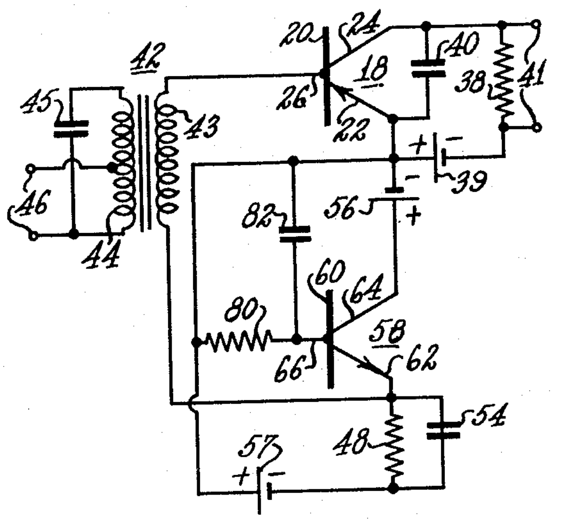

Similarly, in Figure 6, a resistor 80 is connected in series between the base 66 of the second or compensating transistor 58 and the emitter 22 of the first or compensated transistor 18, while a by-pass capacitor 82 is connected in parallel with the resistor 80 and between the base 66 and the emitter 22. In other respects, the circuit is identical with the circuit illustrated in Figure 2. Here, as in the case of the conditions assumed for Figure 3 however, the voltage drop across the base lead of the second transistor 58 is less than the voltage which is needed to compensate for the voltage drop across the base lead resistance of the first transistor. Accordingly, the insertion of the resistor 80 and the by-pass capacitor 82 in the circuit as shown will compensate for these unequal voltage drops so that they will become equal.

For some applications, for example, where the compensating transistor is used as a separate stage in a radio receiver, design considerations such as the gain desired from that stage, distortion, etc., the emitter resistor 48 of the compensating stage may have to be given a value other than that required for the optimum compensating bias. Thus, for example, the compensating transistor may be used as an intermediate-frequency amplifier of a superheterodyne receiver where the collector current requirements are such that the value of emitter resistance corresponding to that collector current make the resulting direct current base-emitter voltage which is used as the compensating bias for the compensated transistor too small. In other cases, the resistance of the emitter biasing resistor 48 may be adjusted to a value which makes the corresponding base-emitter voltage too great for the compensated transistor. In such instances, the biasing arrangement of the circuits may be altered so as to change the potential at the base of the compensated transistor. This aspect of the invention is illustrated in Figures 7, 8 and 9 of the drawing, reference to which is now made.

Figure 7:
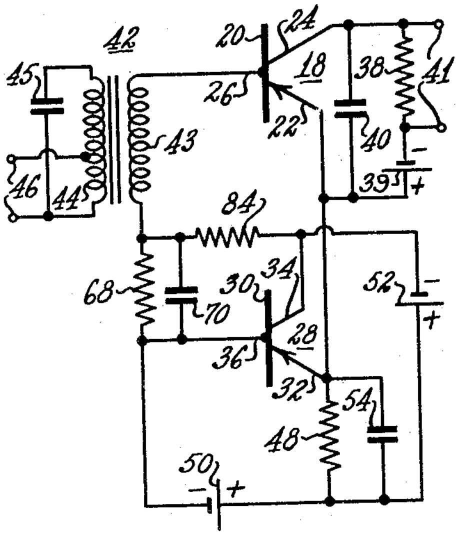
Figure 8:
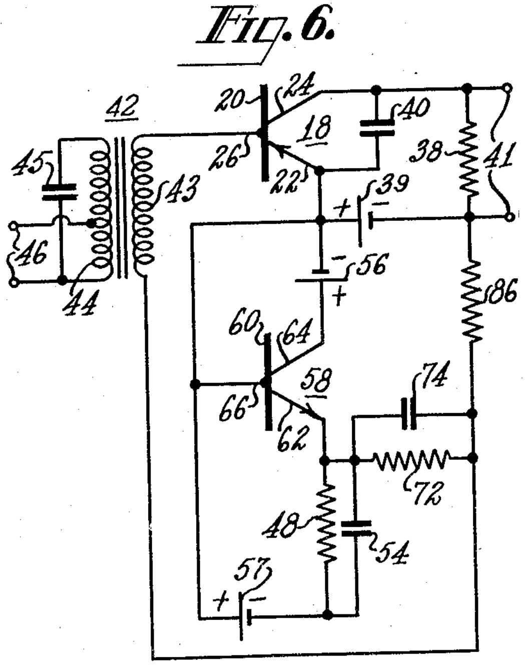
Figure 9:
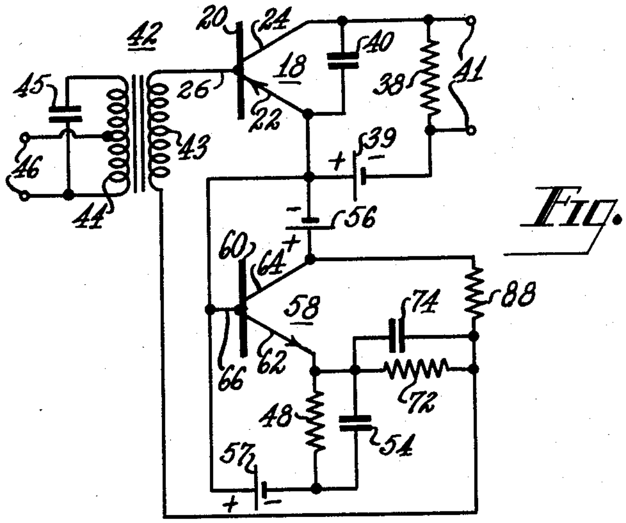

In Figures 7 and 8, it is assumed that the first condition as referred to above exists, that is, the resistive value of the emitter biasing resistor 48 has been changed to satisfy design considerations such that the resulting base-emitter voltage of the compensating transistor is too small to satisfy the optimum bias requirements of the compensated transistor 18. For this condition, the direct current voltage at the base return of the first or compensated transistor 18 must be made more negative in those cases where it is of N-type conductivity.

To this end, in Figure 7 of the drawing, the biasing battery 52 has its negative terminal returned to the collector 34 of the compensating transistor 28, and in addition, through a resistor 84, having a relatively high resistance, and the secondary winding 43 of the input transformer 42 to the base 26 of the first or compensated transistor 18. The resistance of the resistor 84 may be in the order of tens of thousands of ohms depending on how much the resistance of the emitter biasing resistor 48 is changed to satisfy the particular design requirements for the second transistor 28. In other respects, the circuit is seen to be identical with the one illustrated in Figure 3 of the drawing. By virtue of this biasing arrangement it is evident that for those conditions wherein the base-emitter voltage of the second transistor 28 is too small to satisfy the optimum bias requirements of the first transistor 18 compensation will be achieved. While the invention has been illustrated here in connection with one P–N–P transistor 28 supplying a temperature sensitive bias for another P–N–P transistor 18, both transistors could be of P-type conductivity if the polarity of the biasing batteries were reversed. Furthermore, one transistor could be of N-type conductivity and the other of P-type conductivity. This is illustrated in Figure 8, reference to which is now made.

As was mentioned above, it is assumed, for Figure 8, that the base-emitter voltage of the compensating transistor 58 is too small to satisfy the optimum bias requirements of the first or compensated transistor 18. Hence, since the transistor 18 is of N-type conductivity, its base 26 must be made more negative. To this end, the negative terminal of the biasing battery 39 is connected through the load resistor 38 to the collector of the first transistor 18, and in addition through a resistor 86, having a relatively large resistance, and the secondary winding 43 of the input transformer 42 to the base 26 of the first transistor 18. In other respects the circuit is seen to be identical with the one illustrated in Figure 4, and is seen to satisfy optimum bias requirements for those instances where the base-emitter voltage of the second transistor 58 is too small.

In Figure 9, it is assumed that the second condition as referred to above exists, that is, the resistive value of the emitter biasing resistor 48 has been changed to satisfy design considerations such that the resulting base-emitter voltage of the compensating transistor 58 (here shown as being of the N-P-N junction type) is too great to satisfy the optimum bias requirements of the compensated transistor 18. For this condition, the direct current voltage at the base return of the first or compensated transistor 18 must be made more positive in those cases where it is of N-type conductivity.

To this end, in Figure 9 of the drawing, the biasing battery 56 has its positive terminal connected directly with the collector 64 of the second transistor 58 and, in addition, through a resistor 88, having a relatively high resistance, and the secondary winding 43 of the input transformer 42 to the base 26 of the first or compensated transistor 18. In other respects the circuit is seen to be identical with the one illustrated in Figure 4 of the drawing. By virtue of this biasing arrangement it is evident that for those conditions wherein the base-emitter voltage of the second transistor 58 is too great to satisfy the optimum bias requirements of the first transistor 18, compensation will be achieved. As in the previous figures, the conductivity of each of the transistors may be reversed if the polarity of the biasing batteries is also reversed. That is, transistor 18 may be of P-type conductivity and transistor 58 may be of N-type conductivity. Moreover, two transistors of the same conductivity type may be used.

In practice, it is possible, by provision of the novel features of the present invention, to provide a temperature sensitive bias for the base-emitter circuit of one active transistor in a signal conveying circuit from the base-emitter circuit of another active transistor in the same signal conveying circuit. Accordingly, for example, the compensated transistor may serve as one of the amplifiers in a signal receiver while the compensating transistor may serve as a signal amplifier in addition to its temperature compensation function. It is also possible, for example, to have the compensating transistor be, in addition, one of the intermediate frequency amplifiers of a superheterodyne signal receiver while the compensated transistor may serve as the signal detector in the same signal receiver. Such an application of the present invention is illustrated in Figure 10, reference to which is now made.

Figure 10:
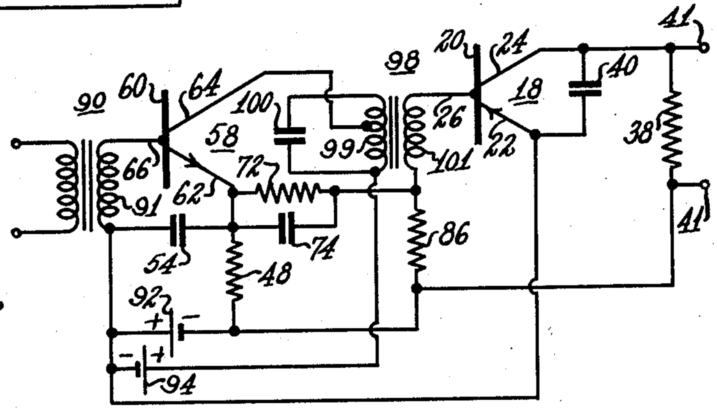
Figure 10 is a schematic circuit diagram showing the use of an N-P-N transistor signal amplifier which is used to compensate for temperature variations of a P-N-P transistor signal detector.

In Figure 10, an intermediate frequency amplifier and the detector for a signal receiver comprise an N-P-N junction transistor 58 of the type described hereinbefore and a P-N-P junction transistor 18, respectively. The input circuit for the transistor amplifier 58 includes an input transformer 90, the secondary winding 91 of which is connected at one end to the base 66 of the transistor and at the other end through the constant current emitter biasing resistor 48 to the emitter 62 of the transistor. In this manner, input signals, such as intermediate frequency signals, may be coupled between the base 66 and the emitter 62 of the transistor 58.

The output circuit for the N-P-N junction transistor 58 includes a coupling transformer 98, the primary winding 99 of which is connected through a tap to the collector 64 of the transistor 58. To provide frequency selection at the intermediate frequency, a tuning capacitor 100, which may be variable, shunts the primary winding 99. The secondary winding 101 of the coupling transformer is connected at one end to the base 26 of the P-N-P transistor detector 18 and from its other end through the resistor 86 to a biasing battery 92.

In other respects, the circuit illustrated in Figure 10 is much the same as the circuit illustrated in Figure 8 of the drawing. Accordingly, it is assumed that due to the varying characteristics between the two transistors the voltage drop across the base lead resistance of the transistor amplifier 58 is greater than the voltage drop across the base lead resistance of the transistor detector 18. To correct this condition, the resistor 72 is connected in series with the secondary winding 101 of the coupling transformer 98 between the base 26 of the transistor detector 18 and the emitter 62 of the transistor amplifier 62. Furthermore, as in Figure 8, it is assumed that the resistance of the emitter biasing resistor 48 has been changed to satisfy design considerations of the receiver such that the resulting base-emitter voltage of the compensating transistor amplifier 58 is too small to satisfy the optimum bias requirements of the compensated transistor, here the transistor detector 18. Accordingly, the base return of the transistor detector 18 is made more negative by returning the base 26 through the secondary winding 101 of the coupling transformer 98 and the high resistance resistor 86 to the negative terminal of the biasing battery 92.

One battery has been eliminated from the circuits previously described in the case of the circuit illustrated in Figure 10. Hence, only two batteries are needed to bias both transistors, the battery 92 and a battery 94, the negative terminal of which is connected directly with the emitter 22 of the transistor 18 and through the secondary winding 91 of the input transformer 90 to the base 66 of the transistor amplifier 58. The positive terminal of this battery is connected through the primary winding 99 of the coupling transformer 98 and the tap to the collector 64 of the transistor amplifier 58.

As described, it is evident that like the previous circuits, the base-to-emitter bias of the transistor detector 18 is derived from the direct current voltage which exists between the emitter 62 and the base 66 of the transistor amplifier 58. This voltage may be adjusted to the desired value for proper biasing of the detector by changing the resistance of the emitter biasing resistor 48. This value is adjusted to give the optimum bias for the transistor detector 18 which operates over a non-linear portion of its transfer characteristic curve. As thus described, any change in the zero voltage conductance and thus the base-emitter voltage of the transistor detector 18 due to a change in the ambient temperature will be completely compensated for by the change in these same characteristics of the transistor amplifier 58.

Furthermore, as described before, any change in the bias condition of the transistor detector 18 due to the variation of base saturation current with temperature variations will be cancelled by a like variation of the base saturation current of the transistor amplifier 58. Thus, a high gain and distortion free circuit is provided which comprises an amplifier and detector stage. Accordingly, a signal is developed across the load resistor 38 which is a faithful reproduction of the modulation envelope of the incoming signal.

While it will be understood that the circuit specifications may vary according to the design for any particular application, the following circuit specifications are included for the circuit of Figure 10 by way of example only:

| | |
|---|---|
| Resistors 48, 72 and 86 | 5600; 330; and 56,000 ohms, respectively. |
| Capacitors 40, 54 and 74 | .01; .1; and 10 microfarads, respectively. |
| Batteries 92 and 94 | 6 volts each. |
| Transistor 58 | RCA type 2N35. |
| Transistor 18 | RCA type SX160. |

Figure 11:
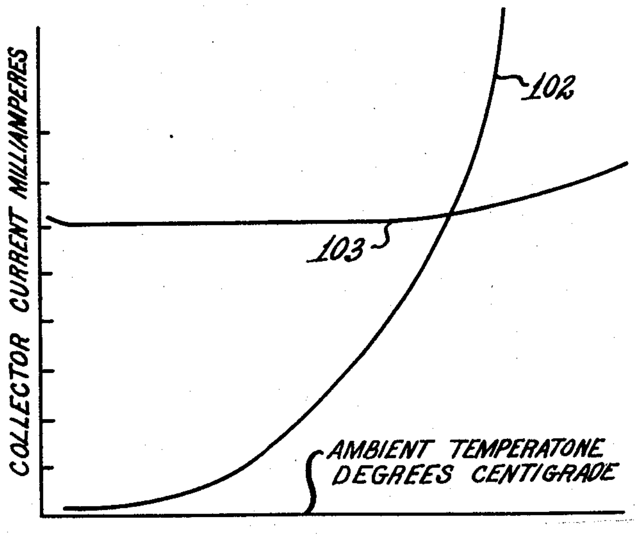
Figure 11 is a graph showing curves relating transistor collector current to ambient temperature for an uncompensated and a compensated condition of operation as a signal translating device.

The improved performance of a circuit constructed in accordance with the invention can be depicted graphically. This is shown in Figure 11 where two curves have been plotted, the curve 102 representing the collector current variations with ambient temperature variations for an uncompensated detector, and the curve 103 representing the collector current variations with ambient temperature variations for a compensated detector of the type illustrated in Figure 10. It is readily apparent, of course, that the collector current for the uncompensated stage varies widely as the temperature changes while the collector current remains substantially constant over a wide range of temperatures for a stage compensated for in accordance with this invention. It has been found that satisfactory operation can be expected over a range of temperatures from −50° to +65° C., which is well beyond the normal temperature range that might be expected.

Figure 12:
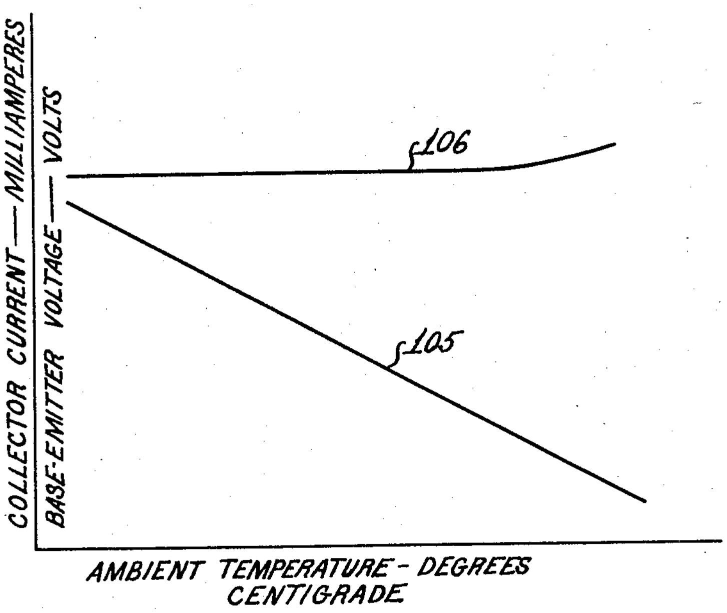
Figure 12 is a graph showing curves relating transistor collector current to ambient temperature and base-emitter voltage to ambient temperature for optimum temperature operating conditions.

In order to achieve the results herein described the direct current base-to-emitter voltage of a transistor should change with temperature as shown by the curve 105 in Figure 12, where the base-emitter voltage of a compensated transistor has been plotted against ambient temperature variations. The collector current variations with changes in temperature corresponding to the optimum base-to-emitter voltage as indicated by the curve 105 are shown by the curve 106—which is the same as the curve 103 of Figure 11. By virtue of the present invention, the base-to-emitter voltage of a transistor may be maintained at this optimum point over a wide range of temperatures.

Figure 13:
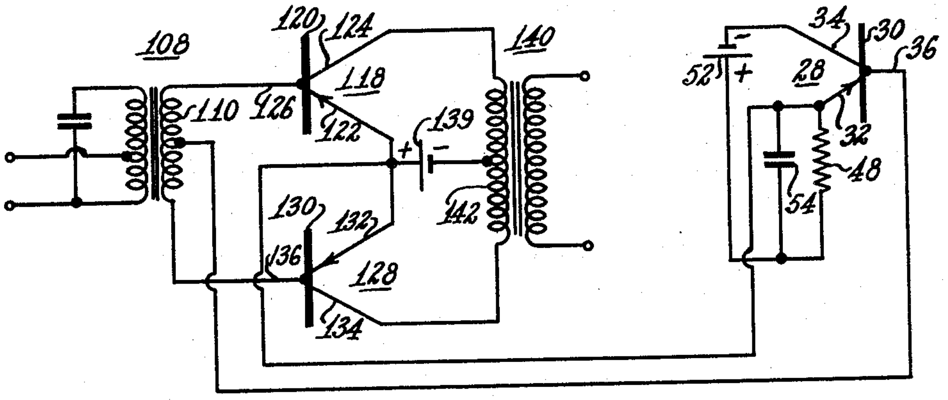
Figure 13 is a schematic circuit diagram illustrating a transistor class B amplifier which is compensated for temperature variations in accordance with the invention.

The present invention is not limited to the control of one transistor. Hence, it is possible to supply a temperature sensitive bias for a pair of transistors connected for class B push-pull operation. This embodiment of the invention is illustrated in Figure 13 where an input transformer 108 has its secondary winding 110 connected at either end to the respective base electrodes 126 and 136 of a pair of P-N-P junction transistors 118 and 128 connected for class B push-pull operation.

The transistor 118 includes a semi-conductive body 120 and three contacting electrodes which have been designated as an emitter 122, a collector 124 and the base 126. Similarly, the transistor 128 includes a semi-conductive body 130 and three contacting electrodes which are designated as an emitter 132, a collector 134 and the base 136. As shown, the respective emitters 122 and 132 are connected together, while an output circuit for the transistors is provided by connecting the respective collectors 124 and 134 to either end of the primary winding 142 of an output transformer 140. A biasing battery 139 is connected from a center tap on the primary winding 142 to the junction of the common emitters 122 and 132. This portion of the circuit will be recognized as being a somewhat conventional push-pull stage.

To provide bias voltage for the class B push-pull transistors 118 and 128 which is temperature controlled, the junction transistor 28 is provided. The transistor 28 may be identical with the P-N-P compensating transistors hereinbefore described. To provide the temperature controlled bias, the emitter 32 of this transistor is connected directly with the common emitters 122 and 132 of the push-pull transistors 118 and 128. Further, and in accordance with the invention, the base 36 of the compensating transistor 28 is connected to a center tap on the secondary winding 110 of the input transformer 108.

As thus described, it is apparent that the base-to-emitter bias for the push-pull transistors 118 and 128 is derived from the direct-current voltage which exists between the emitter 32 and the base 36 of the compensating transistor 28. This voltage may be adjusted to a desired value by varying the resistance of the emitter biasing resistor 48. Since the base-emitter voltage of the compensating transistor 28 is temperature sensitive, as described hereinbefore, optimum bias will be established for the push-pull transistors 118 and 128 over their operating range. Consequently, by virtue of the present invention, a substantially distortion-free push-pull signal may be derived from the output transformer 140 despite wide variations in ambient temperature.

It should be apparent that the present invention is applicable to other classes of transistor operation and other circuit arrangements—the ones illustrated being by way of example only. It should also be apparent that by provision of the present invention, stabilization of signal conveying circuits employing transistors with temperature variations is easily accomplished. Accordingly, by deriving a temperature sensitive bias for one or more transistors from another transistor, stable and efficient operation is achieved over a wide range of temperatures. By utilizing the compensating transistor as an active element in a signal conveying circuit, these results are achieved without the use of additional circuit elements. Hence, circuits constructed in accordance with the invention are characterized by stable, efficient and inexpensive operation.

What is claimed is:

1. In a signal translating circuit, the combination comprising, a signal amplifying device including a semi-conductive body of one conductivity type having a base, an emitter and a collector electrode in contact therewith, a signal detecting device including a semi-conductive body of an opposite conductivity type having a base, an emitter and a collector electrode in contact therewith, an input circuit coupled with the base electrode of said signal amplifying device, a frequency selective output circuit coupling the collector electrode of said signal amplifying device with the base electrode of said signal detecting device, a utilization circuit connected with the collector electrode of said signal detecting device, direct current conductive circuit means including a portion of said input circuit connecting the emitter electrode of said signal detecting device with the base electrode of said signal amplifying device, and direct current conductive coupling means including a portion of said frequency selective output circuit connecting the base electrode of said signal detecting device with the emitter electrode of said signal amplifying device, said signal detecting means providing a temperature sensitive direct current biasing voltage for the base-emitter circuit of said signal amplifying device of a polarity and magnitude to effect substantially distortion-free stable operation of said signal translating circuit.

2. In a signal translating circuit, the combination comprising; a first and second transistor each including base, emitter, and collector electrodes; said transistors being of the same conductivity type; means comprising a transformer including a secondary winding having a pair of terminals connected to apply a signal to the base of said first transistor; means direct-current conductively connecting one of said terminals with the base of said first transistor; means providing constant current emitter biasing for only one of said transistors to provide operating point stabilization thereof; and means providing operating point stabilization of the other of said transistors including a direct-current conductive connection between the other terminal of said secondary winding and the base electrode of said second transistor, and means direct-current conductively connecting the emitter of said first transistor with the emitter electrode of said second transistor.

References Cited in the file of this patent

UNITED STATES PATENTS

| | | |
|---|---|---|
| 2,550,518 | Barney | Apr. 24, 1951 |
| 2,666,817 | Raisbeck et al. | Jan. 19, 1954 |
| 2,666,819 | Raisbeck | Jan. 19, 1954 |
| 2,691,075 | Scwartz | Oct. 5, 1954 |
| 2,761,916 | Barton | Sept. 4, 1956 |
| 2,762,873 | Goodrich | Sept. 11, 1956 |
| 2,794,076 | Shea | May 28, 1957 |
| 2,802,938 | Herzog | Aug. 13, 1957 |

OTHER REFERENCES

Article by Reich: "Transistors and Transistor Circuits," Electrical Manufacturing, December 1952, page 104.

Article by Stern and Raper: "Transistor Broadcast Receivers," in Electrical Engineering, December 1954. This is the text of a paper read at IRE convention in March 1954; page 1110 cited.